US012286227B2

(12) United States Patent
Mikic et al.

(10) Patent No.: US 12,286,227 B2
(45) Date of Patent: Apr. 29, 2025

(54) OBLIQUE FLYING WING AIRCRAFT WITH INTERNAL DUCTING AND INTERNAL PROPULSION

(71) Applicant: Joby Aero, Inc., Santa Cruz, CA (US)

(72) Inventors: Gregor Veble Mikic, Santa Cruz, CA (US); JoeBen Bevirt, Santa Cruz, CA (US); Benjamin John Brelje, Ann Arbor, MI (US)

(73) Assignee: JOBY AERO, INC., Santa Cruz, CA (US)

( * ) Notice: Subject to any disclaimer, the term of this patent is extended or adjusted under 35 U.S.C. 154(b) by 0 days.

(21) Appl. No.: 18/593,719

(22) Filed: Mar. 1, 2024

(65) Prior Publication Data

US 2024/0294256 A1 Sep. 5, 2024

Related U.S. Application Data

(60) Provisional application No. 63/449,580, filed on Mar. 2, 2023.

(51) Int. Cl.
*B64C 39/10* (2006.01)
*B64C 3/40* (2006.01)
*B64C 30/00* (2006.01)

(52) U.S. Cl.
CPC .............. *B64C 39/10* (2013.01); *B64C 3/40* (2013.01); *B64C 30/00* (2013.01)

(58) Field of Classification Search
CPC ............ B64C 39/10; B64C 3/40; B64C 30/00
See application file for complete search history.

(56) References Cited

U.S. PATENT DOCUMENTS

| 3,820,743 | A | * | 6/1974 | Young | B64C 29/00 244/56 |
|---|---|---|---|---|---|
| 2010/0006695 | A1 | | 1/2010 | Aguilar | |
| 2019/0382098 | A1 | * | 12/2019 | McDonnell | B64C 39/029 |
| 2022/0177131 | A1 | | 6/2022 | Mikic et al. | |

FOREIGN PATENT DOCUMENTS

CN 108163184 A 6/2018

* cited by examiner

*Primary Examiner* — Valentina Xavier
(74) *Attorney, Agent, or Firm* — Michael A. Guth

(57) ABSTRACT

An oblique flying wing aircraft with internal ducting and airflow. The aircraft may have propulsion units within the wing body. The propulsion units may be off-axis internal to the wing to utilize locations with larger internal space available. In some aspects, the multi-segment oblique flying wing aircraft may have three distinct segments including two outer wing segments and a central wing segment. The central segment may be thicker in the vertical direction and adapted to hold pilots and passengers. The outer wing segments may be substantially thinner and may taper as they progress outboard from the wing center. The multi-segment oblique flying wing aircraft be adapted for rotating into a high-speed flight configuration, or may be adapted for take-off and cruise at a constant angle.

19 Claims, 18 Drawing Sheets

OBLIQUE FLYING WING AIRCRAFT WITH INTERNAL DUCTING AND INTERNAL PROPULSION

CROSS-REFERENCE TO RELATED APPLICATIONS

This application claims priority to U.S. Provisional Patent Application No. 63/449,580 to Mikic et al., filed Mar. 2, 2023, which is hereby incorporated by reference in its entirety.

BACKGROUND

Field of the Invention

The present invention relates to aircraft, and more particularly to an aircraft with an oblique wing design.

Description of Related Art

In 1958, R. T. Jones suggested that aircraft with asymmetrically-swept (oblique) wings would offer many advantages at high transonic and low supersonic speeds. There have been technical challenges associated with all-wing oblique wing configurations, in that such configurations lack the powerful stability and control contributions from traditional tails.

What is called for is an oblique wing aircraft which can support significant cargo and passenger payloads, while maintaining stability during high-speed flight.

SUMMARY OF THE INVENTION

An oblique flying wing aircraft with internal ducting and airflow. The aircraft may have propulsion units within the wing body. The propulsion units may be off-axis internal to the wing to utilize locations with larger internal space available. In some aspects, the multi-segment oblique flying wing aircraft may have three distinct segments including two outer wing segments and a central wing segment. The central segment may be thicker in the vertical direction and adapted to hold pilots and passengers. The outer wing segments may be substantially thinner and may taper as they progress outboard from the wing center. The multi-segment oblique flying wing aircraft be adapted for rotating into a high-speed flight configuration, or may be adapted for take-off and cruise at a constant angle.

DETAILED DESCRIPTION

Figure 1A:
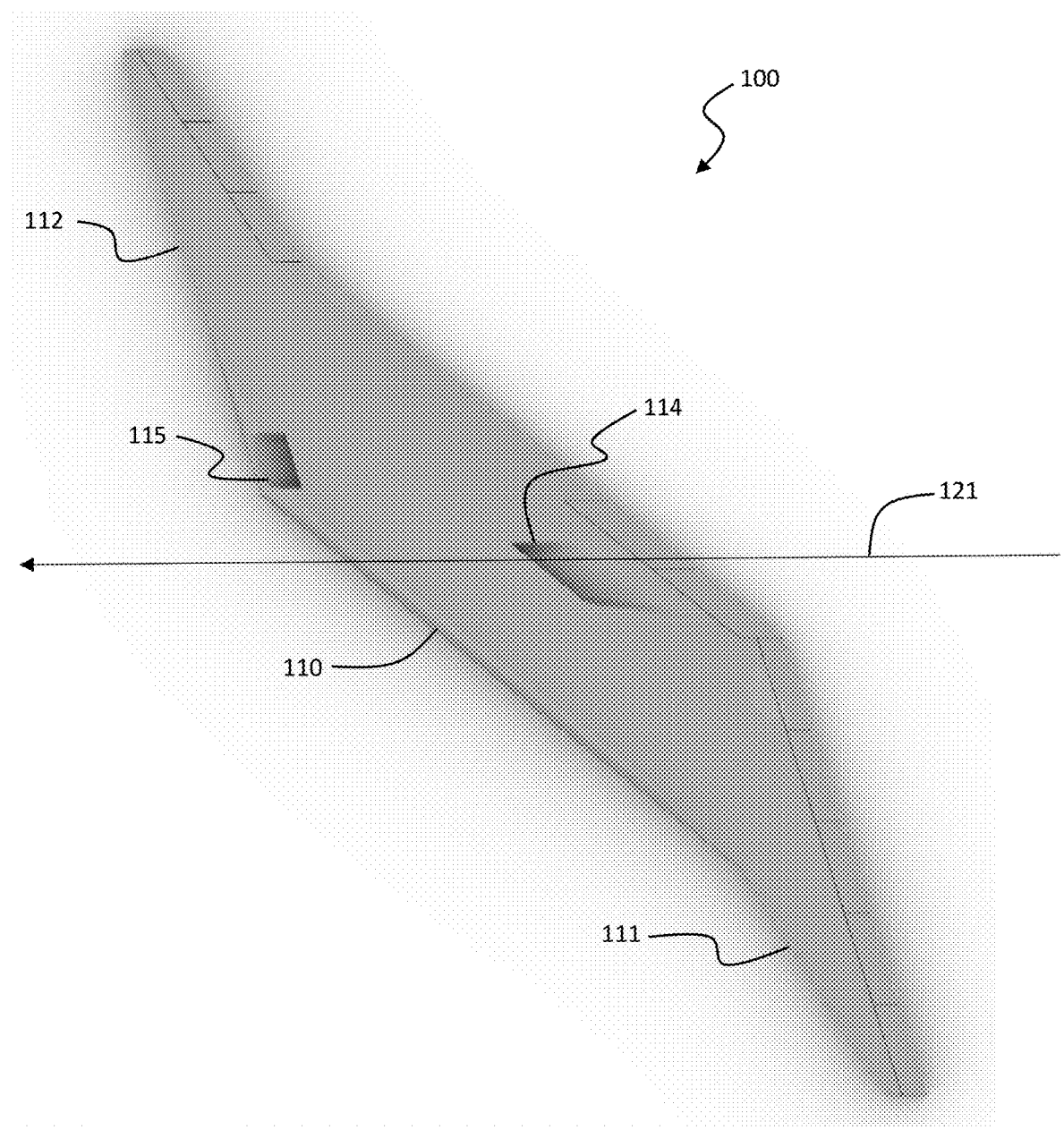
FIGS. 1A-B are shaded and line representations, respectively, of an offset top view of a subsonic aircraft according to some embodiments of the present invention.

High speed aircraft design requires balancing the design requirements for take-off and landing, and slower speed flight, with the design goals centered around high-speed flight, especially in transonic and supersonic speed regimes. Prior designs have included conventional, swept wing, aircraft, and oblique wing designs. An oblique wing arrangement distributes lift over about twice the wing length as a conventional swept wing of the same span and sweep, which provides a reduction in the wave component of lift-dependent drag in the supersonic speed regime by a factor of 4. For oblique flying wings of high aspect ratio, the supersonic volumetric wave drag is also favorable. An oblique flying wing can also prove to be a very efficient configuration in the high transonic speed regime.

An oblique wing aircraft according to embodiments of the present invention uses a long, thick, center segment that may allow for the placement of pilots and passengers in the center segment, and may allow for the use of the multi-segment oblique wing aircraft as a high-speed commercial aircraft. In another aspect, the long, thick, center segment also allows for the placement of propulsion units within the wing body. As the wing body of an oblique wing aircraft may be at an oblique angle during high speed flight, the thicker portion of the wing, which may be rearward of the leading edge of the wing's central segment, may also be at the oblique angleIn some aspects of the present invention, the propulsion units may be mounted within the thicker central segment of the wing, and may also be mounted such that the principal axis of the propulsion unit is in parallel with the oblique angle of the central segment of the wing, which is likely not to be perpendicular to the predominant airflow direction around the wing during flight. With such a configuration the wing's central section may avoid the need for any variance on the wing's external surfaces to accommodate the propulsion units. For example, if the propulsion units, such as a jet engine or an electric fan, were mounted parallel to the flight direction the rearward portion of the propulsion unit may have a thickness higher than the thickness of the wing's central section in areas away from the propulsion unit, especially at the rearward portion of the propulsion unit. The propulsion system may include internal ducting and routing, adapted to inlet air through one or more forward located inlet ducts which route air to the propulsion unit or units, and one or more outlets which exhaust the airflow, and which produce thrust for the aircraft. In some aspects, there may be guiding vanes within the exhaust outlet to adjust the direction of the exhaust flow and the associated thrust. In some aspects, the propulsion unit may be a jet engine. In some aspects, the propulsion unit may be one or more electric fans. In some aspects, the propulsion units may be electric and may be powered by a liquid fueled turbogenerator. In some aspects, the propulsion units may be electric and powered by hydrogen based fuel cells.

In embodiments using a multi-segment oblique flying wing, the air inlet may be offset so that it resides at or adjacent to the outer segment, which may be offset a lower angle than the center segment. The air inlet benefits from the compression of the airflow at the leading edge of the wing. The benefit is enhanced by using a location for the inlet on a portion of the wing which is at a lower oblique angle.

The present invention introduces improvements into known flying systems. The present system allows for the integration of the propulsion units within the volume of the flying wing. Although illustrated herein with regard to a multi-segment oblique flying wing, it is understood that aspects of the present invention may be incorporated into oblique flying wing designs of other types. Another improvement, especially as seen in the supersonic configuration, is having the inlet be formed as part of the leading edge of the center segment, in a manner which envelopes an adjacent portion of the leading edge of the wing. Yet another improvement is the offset inlets and outlets. The offset inlet, especially when located outboard from center and on or adjacent to a wing segment with less sweep, allows the system to utilize the compression of the air which otherwise results from airflow impingement on the leading edge of the wing. Although described herein with regard to oblique wing designs, aspects of the present invention may also be incorporated into symmetric aircraft configurations.

In some embodiments of the present invention, as seen in FIGS. 1A through 9, a multi-segment oblique wing aircraft 100 includes a center wing segment 110, a left wing segment 111, and a right wing segment 112. The center wing segment 110 is substantially thicker in the Zb direction (as defined below), and is thick enough to allow for propulsion units in a thicker area of the wing 118. The aircraft may be adapted to fly at subsonic speeds. In this illustrative example, the aircraft 100 may be adapted to fly at subsonic speeds in the range of Mach 0.8, with a span of 11.5 m and a length of 9 m. Although illustrated with the right wing segment 112 as the leading portion of the oblique wing, it is to be understood that left and right may be mirrored in different embodiments an be within the disclosure of the present invention.

An air inlet 115 is located just outboard of the conjunction of the center wing segment 110 and the right wing segment 112, which is the forward wing segment during flight in this embodiment. In some aspects, the air inlet 115 is wholly outboard of centerline of the aircraft in a forward flight configuration. In some aspects, the air inlet 115 is wholly outboard of the center wing segment 110. In some aspects, the air inlet 115 is located above the leading edge of the wing. An air outlet 114 is seen on the upper surface of the center segment 110. In some aspects, the air outlet 114 is not centered on the centerline of the aircraft during forward flight. In some aspects, the air outlet 114 is offset from the centerline of the aircraft to the side opposite that of location of the air inlet 115. A direction reference line 121 illustrates the flight path of the aircraft during forward flight, and is placed approximately at the center of mass of the aircraft. As can be seen, the air inlet 115 is substantially starboard of the center line of the aircraft.

Figure 3A:
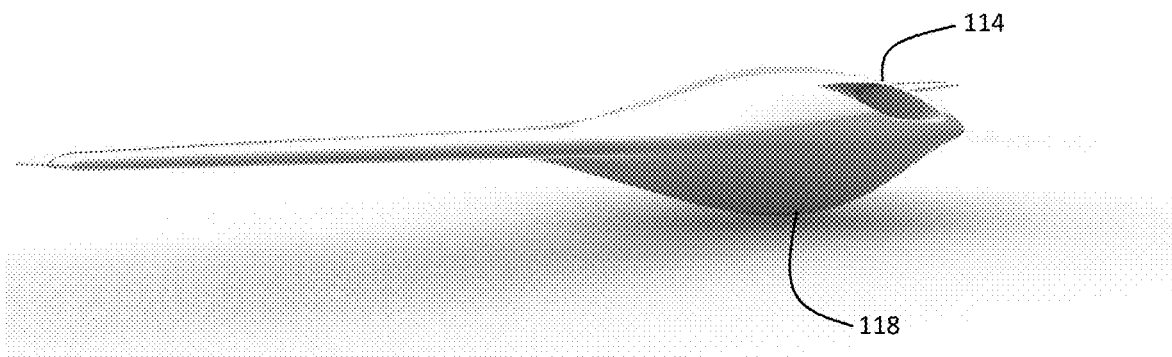
FIGS. 3A-B are shaded and line representations, respectively, of a side view of a subsonic aircraft according to some embodiments of the present invention.
Figure 3B:
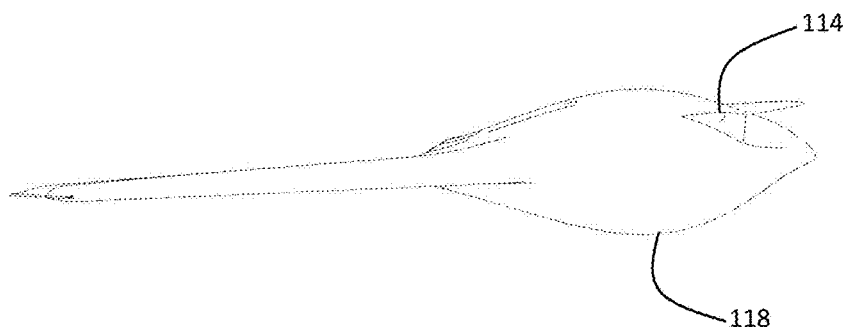
Figure 4:
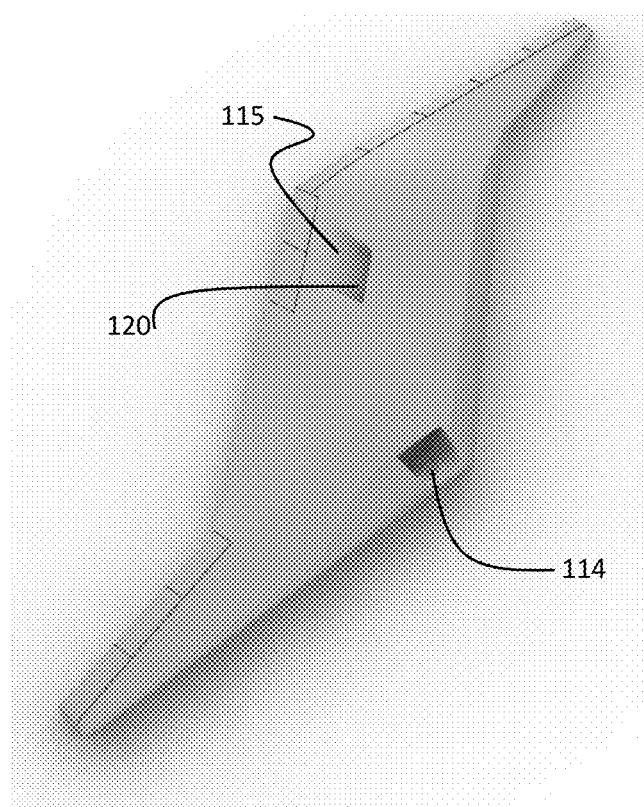
FIG. 4 is a raised side perspective view of a subsonic aircraft according to some embodiments of the present invention.
Figure 5A:
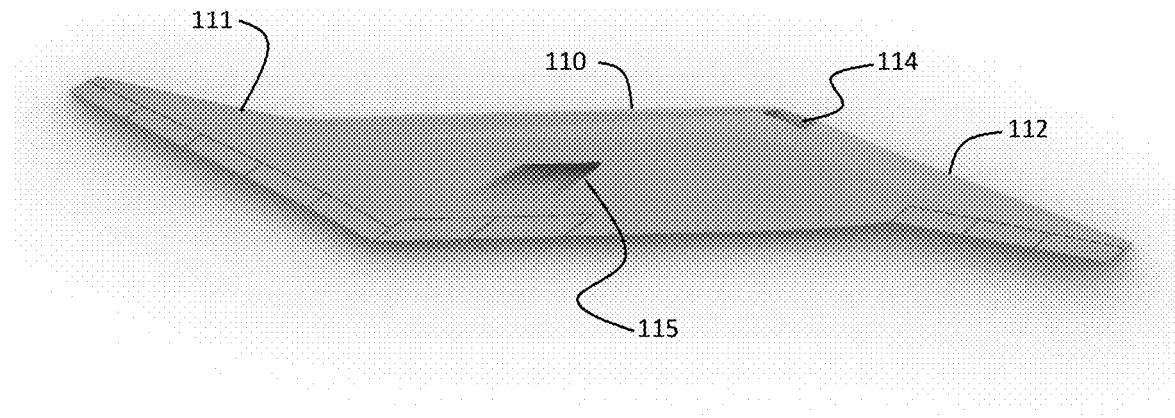
FIGS. 5A-B are shaded and line representations, respectively, of a rear perspective view of a subsonic aircraft according to some embodiments of the present invention.
Figure 5B:
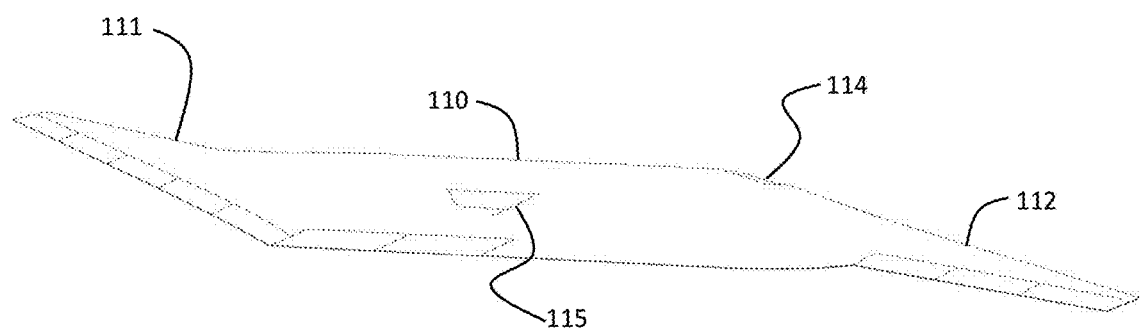

FIGS. 1 and 3A-B further illustrate relatively thin nature of the right wing segment 112 and the left wing segment 11 relative to the thick nature 118 of the center segment 110. In some aspects, the relative the ratio of the thickness of the center segment to the outer segments is in the range of 1.5 to 10. In some aspects, the relative the ratio of the thickness of the center segment to the outer segments is in the range of 3 to 10. In some aspects, the relative the ratio of the thickness of the center segment to the outer segments is in the range of 5 to 10. In some aspects, the sweep of the wing segments remains constant during different flight modes. The forward sweep of the leading outer wing segment may be 25 degrees. In some aspects, the forward sweep of the leading outer wing segment may be in the range of 15 to 35 degrees. In some aspects, the forward sweep of the leading outer wing segment may be in the range of 0 to 60 degrees. The rearward sweep of the trailing outer wing segment may be 35 degrees. In some aspects, the rearward sweep of the trailing outer wing segment may be in the range of 25 to 45 degrees. In some aspects, the rearward sweep of the trailing outer wing segment may be in the range of 0 to 60 degrees. The sweep of the center wing segment may be 50 degrees. In some aspects, the sweep of the center wing segment may be in the range of 35 to 65 degrees. In some aspects, the sweep of the center wing segment may be in the range of 25 to 75 degrees. The auxiliary control surfaces may include controllable control surfaces along its trailing edge.

Figure 1B:
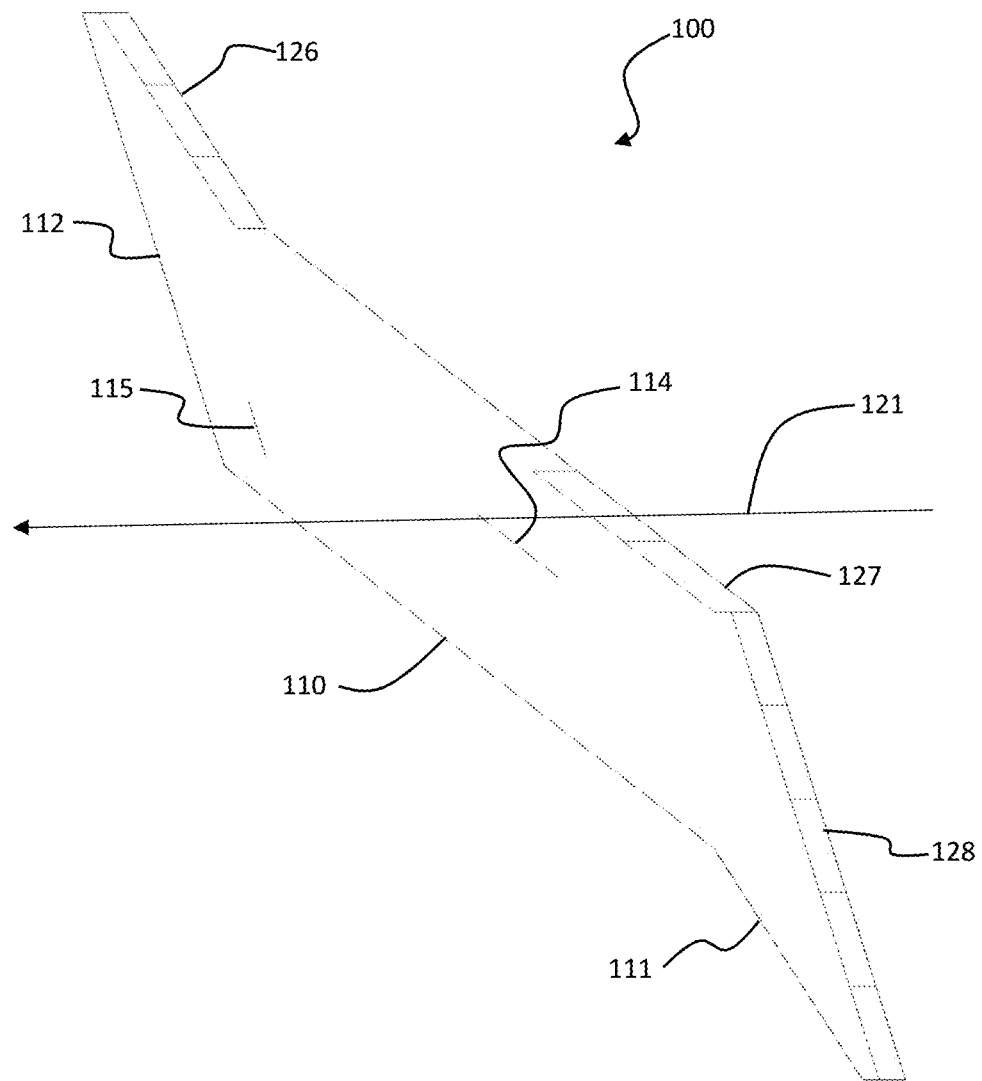
Figure 2:
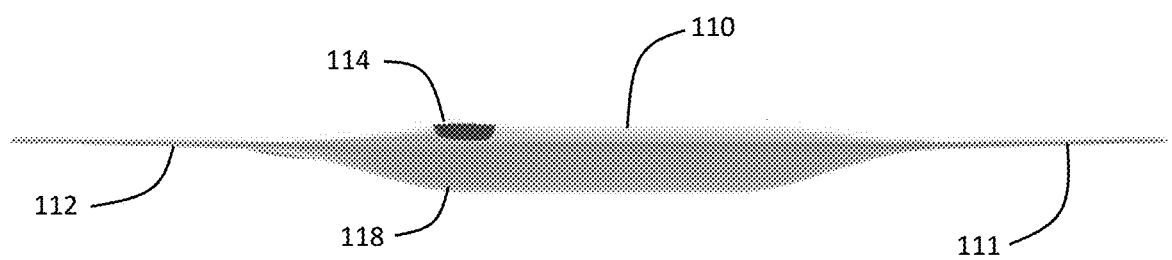
FIG. 2 is a front view of a subsonic aircraft according to some embodiments of the present invention.

In some embodiments of the present invention, as seen in FIG. 1B, the aerial vehicle may have control surfaces on a rearward side of the wing surfaces. The right wing segment 112 may have control surfaces, such as flaps or ailerons 126, on the rearward side of the wing segment. The left wing segment 11 may have control surfaces, such as flaps or ailerons 128, on the rearward side of the wing segment. The center segment 110 may have control surfaces, such as flaps or ailerons 127, on the rearward side of the wing segment.

Figure 6:
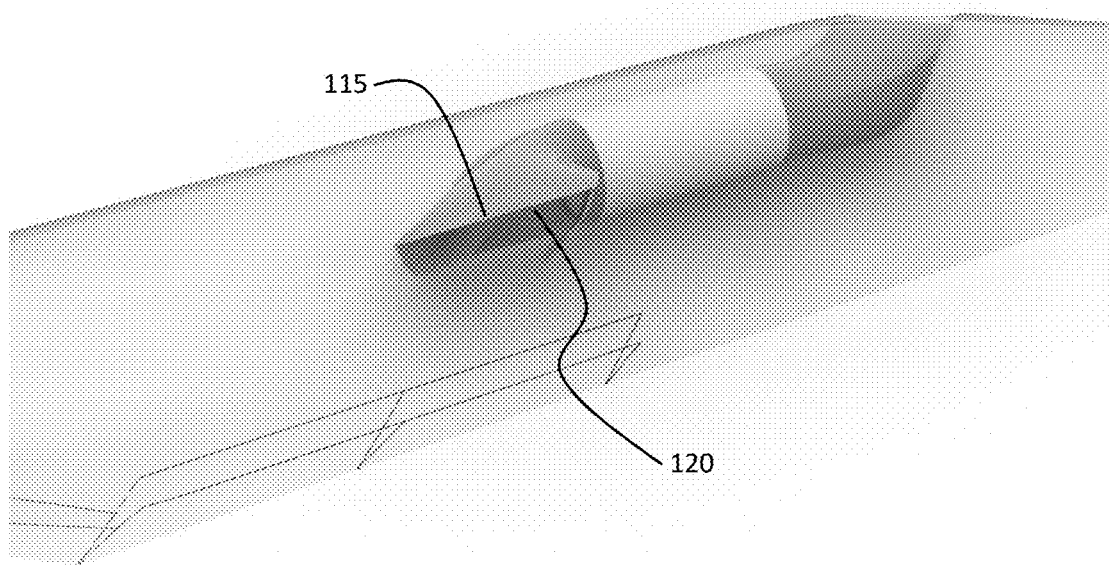
FIG. 6 illustrates the internal air ducting and powerplant of a subsonic aircraft according to some embodiments of the present invention.
Figure 7:
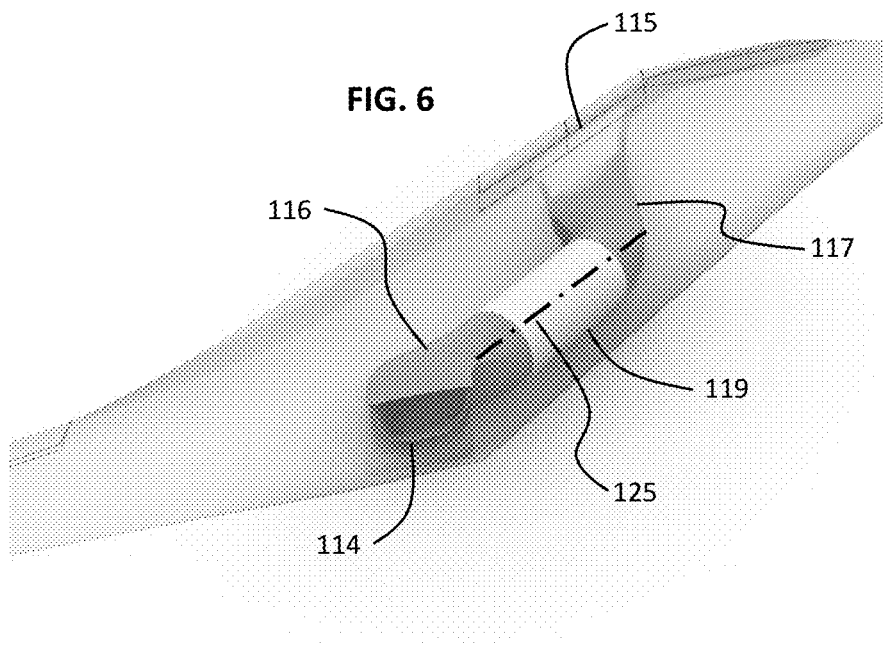
FIG. 7 illustrates the internal air ducting and powerplant of a subsonic aircraft according to some embodiments of the present invention.
Figure 8:
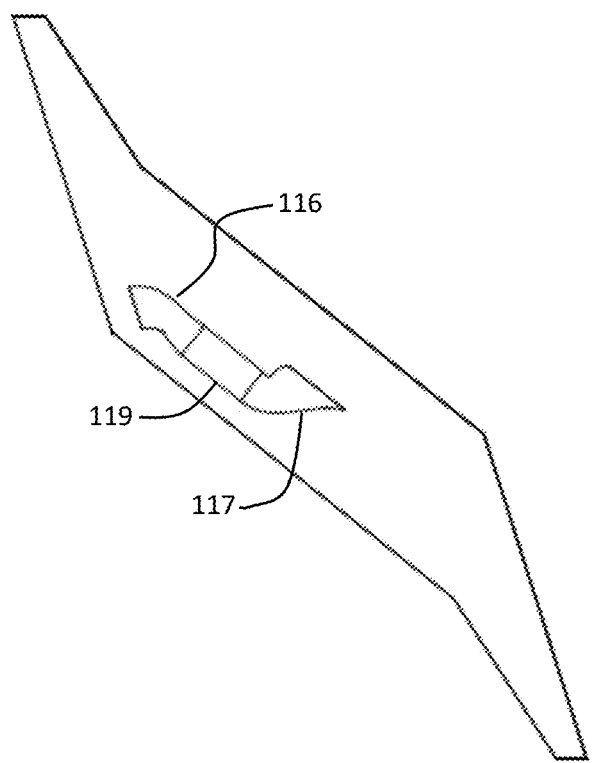
FIG. 8 illustrates the internal air ducting and powerplant of a subsonic aircraft according to some embodiments of the present invention.
Figure 9:
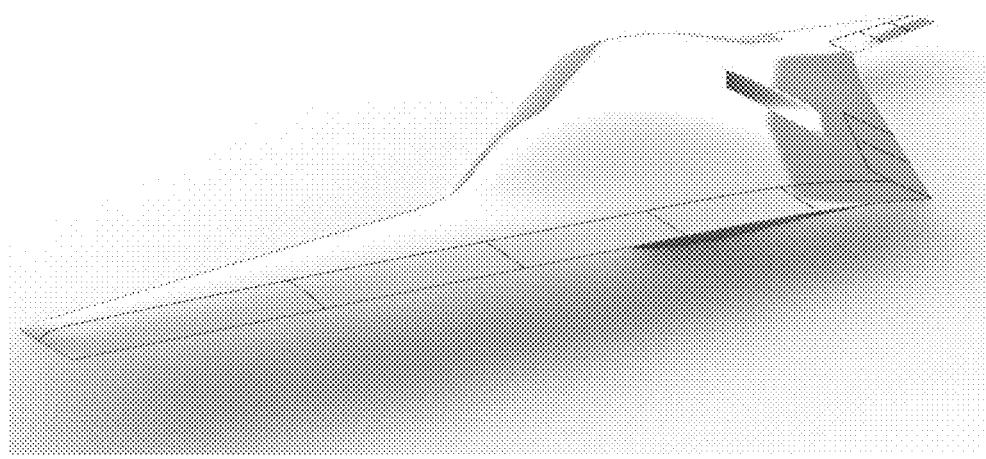
FIG. 9 is a raised side rear perspective view of a subsonic aircraft according to some embodiments of the present invention.

FIGS. 6, 7, and 8 illustrate the internal ducting and the internal location of the propulsion unit 119 within the center segment 110. FIG. 6 is a rear perspective view of the aircraft 100 illustrating the air outlet 115 facing rearward. FIGS. 6 and 7 provide illustration of the internal aspects of the inlet, outlet, and propulsion unit although it is understood that these components would not be able to be seen in this manner in real life, and are shown here for clarity of understanding. The air inlet 114 is fluidically coupled to an inlet duct 116 which routes air to the propulsion unit 119. The propulsion unit 119 is then fluidically coupled to the outlet duct 117 which routes air to the air outlet 115. As can be seen, the principal axis 125 of the propulsion unit, which may be the rotation axis of thrust generating components, is not in line with the ultimate thrust direction, but is instead in line with the span direction of the center segment 110 of the oblique wing aircraft 100. In some aspects, the principal axis 125 of the propulsion unit 119 may be parallel with the leading edge of the center section. In some aspects, the principal axis of the propulsion unit 125 may be parallel with the composite leading edge of the center section to within 5 degrees. In some aspects, the principal axis of the propulsion unit 125 may be parallel with the composite leading edge of the center section to within 10 degrees. Thus, the propulsion unit 119, which may be by design constrained to be of a larger diameter, or may be by design choice designed to be of a larger diameter, may reside within the thicker area 118 of the center segment 110 without presenting any exterior perturbation of the outside surface of the wing. In some aspects, in this manner, the exterior surfaces of the center segment will be uniform across the center segment and will not have shape changes or deformations that are accommodation for the internal mounting of the propulsion unit or units within the center segment. In some aspects, there may be vanes 120 within the outlet duct 117 at the air outlet 115 which may be used for lateral thrust vectoring. Although illustrated herein with the primary axis of the propulsion unit aligned with the oblique angle of the center segment, in some aspects the primary axis may be in line with the primary thrust direction of the aircraft. In some aspects, there may be more than one propulsion unit in the center segment. In some aspects, there are a plurality of propulsion units in the center segment. In some aspects, the plurality of propulsion units in the center segment have principal axes which are parallel.

Figure 10:
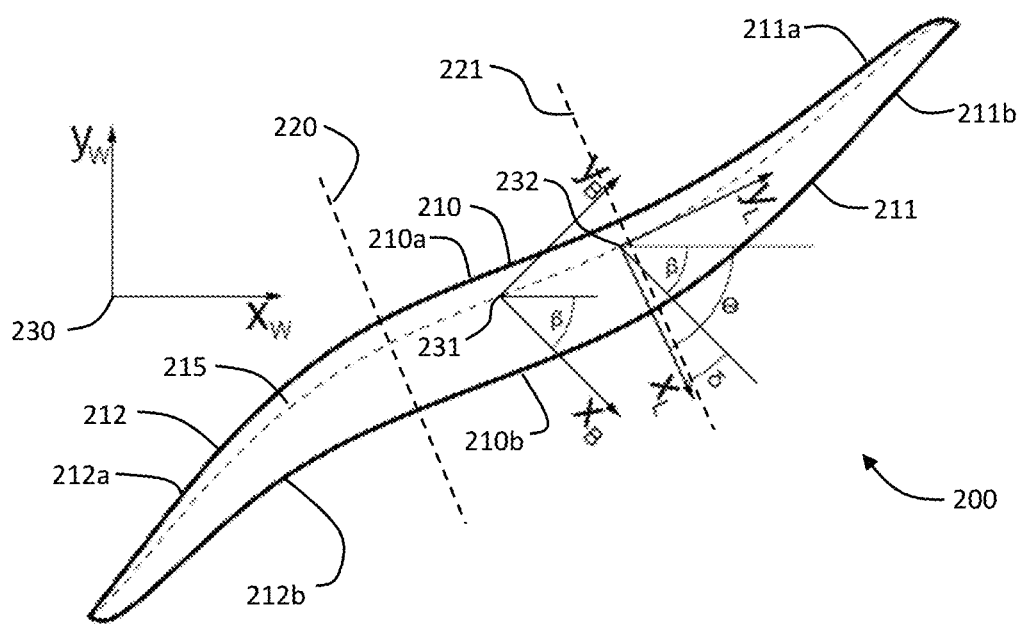
FIG. 10 is an illustration of coordinate systems and terms for a multi-segment oblique wing according to some embodiments of the present invention.

In some embodiments of the present invention, as seen in FIG. 10, a multi-segment oblique wing aircraft 200 includes a center wing segment 210, a left wing segment 212, and a right wing segment 211. The center segment 210 has a leading edge 210a and a trailing edge 210b. Although there may be variations along their lengths, the leading edge 210a and the trailing edge 210b of the center segment 210 are substantially parallel. The center segment 210 may be substantially thicker than the other segments and may be adapted to contain pilots and passengers of the aircraft. Although illustrated without propulsion units shown, it is understood the multi-segment oblique wing aircraft 200 may be powered similarly to the aircraft 100 discussed above. In some aspects, as discussed further below, the thrust units will be non-rotating thrust units, and the aircraft is adapted to take-off and cruise at a constant wing position. In some aspects, the propulsion system may have guide vanes in the outlet system, as discussed above, and the aircraft may take-off in a less swept orientation, and then transition to a more swept orientation, with the guide vanes adjusting the thrust direction as needed. In this illustrative embodiment, the aircraft is mirrored left to right as compared to the earlier subsonic embodiment described above with regard to FIGS. 1-9. It is to be understood that the oblique wing aircraft may use either a right side leading segment or a left side leading segment, in that the design may be mirrored in some applications.

The left wing segment 212 has a leading edge 212a and a trailing edge 212b. The left wing segment 212 tapers as it routes outboard from the center segment 210, in that the chord length lessens along the span of the wing segment. The left wing segment 212 may be substantially thinner in the vertical direction Zb than the center segment 210. The right wing segment 211 has a leading edge 211a and a trailing edge 211b. The right wing segment 211 tapers as it routes outboard from the center segment 210, in that the chord length lessens along the span of the wing segment. The right wing segment 211 may be substantially thinner in the vertical direction Zb than the center segment 210.

FIG. 10 introduces coordinate systems which illustrate aspects of the system. A prevailing wind coordinate system 230 includes the prevalent airflow across the wing as a composite of Xw and Yw, with Xw being the airflow direction seen in forward flight directly into the wind. A body coordinate system 231 is set to remain constant with the body of the wing, with the Yb axis set approximately parallel to the composite average direction of the leading edges 212a, 211a of the wings. The Zb axis of the body coordinate system comes out of the view towards the viewer. A quarter chord coordinate system 232 sets Yl as parallel to the quarter chord tangent at that point, and Xl as perpendicular to the quarter chord at that point. The body coordinate system 231 remains fixed with regard to the aircraft. The prevailing wind coordinate system 230 is a product of the environment and is independent of the wing, and the quarter chord coordinate system 232 a function of the wing design but alters relative to which point on the wing is being referenced.

The multi-segment wing may be viewed as having a transition from the left wing segment 212 to the center wing segment 210 at a reference line 220, and as having a transition from the right wing segment 211 to the center wing segment 210 at a reference line 221. Within the reference lines 220, 221, the leading edge 210a and the trailing edge 210b of the center segment 210 are substantially parallel.

An aspect of the multi-segment wing aircraft 200 is that each of the segments 210, 211, 212 may have their own critical Mach number. The critical Mach number is the ratio of speed of local wind to the speed of sound at which drag increases due to compressibility effects, and is a function of airfoil thickness, lift on the section, and the local sweep of the section. In the context of this application, sweep refers to quarter chord sweep. The goal is for all segments to have a similar critical Mach number that is slightly larger than the design Mach number of the vehicle. The center wing segment 210 is substantially thicker than the outer wing segments 211, 212 and will require more sweep for the same critical Mach number. The outer wing segments 211, 212 are thinner and will require less sweep for the same critical Mach number.

Figure 11:
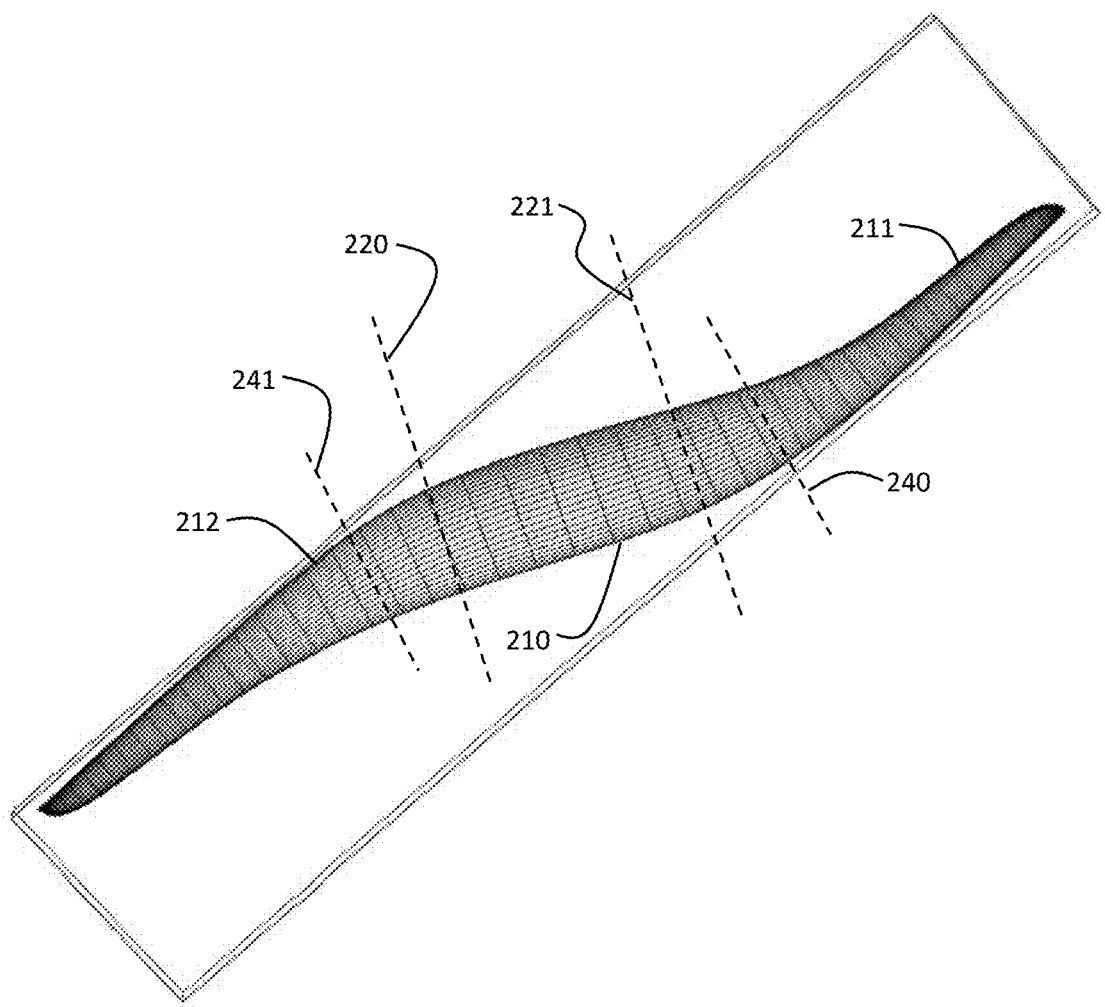
FIG. 11 is an illustration of terms for a multi-segment oblique wing according to some embodiments of the present invention.
Figure 12A:
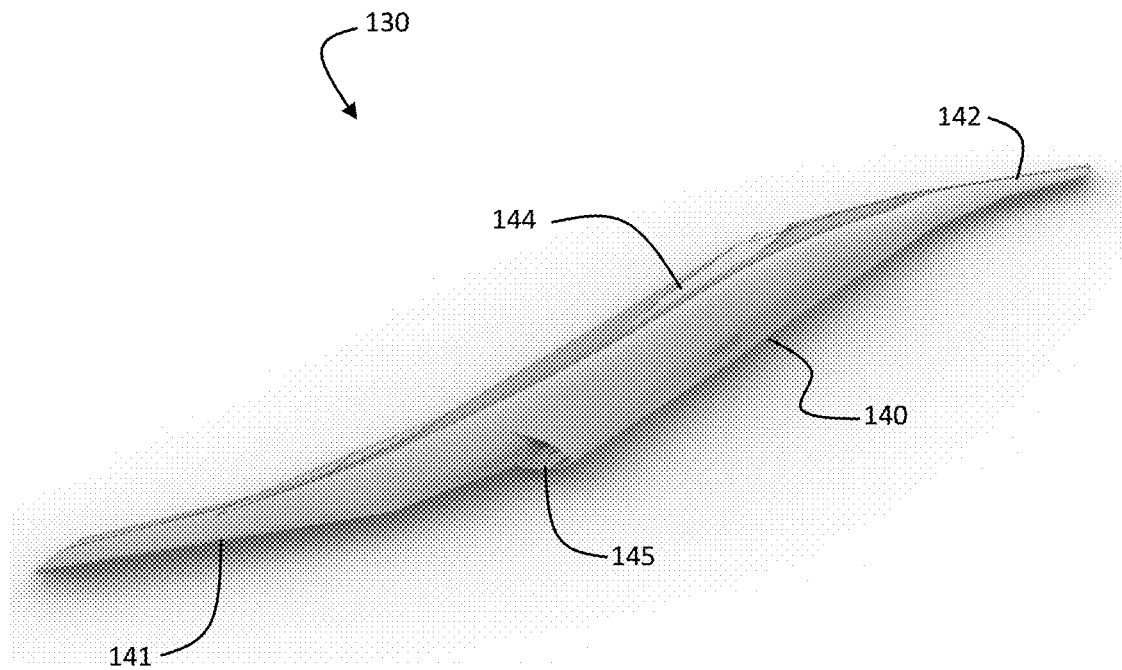
FIGS. 12A-B are shaded and line representations, respectively, of right side perspective views of a supersonic aircraft according to some embodiments of the present invention.
Figure 12B:
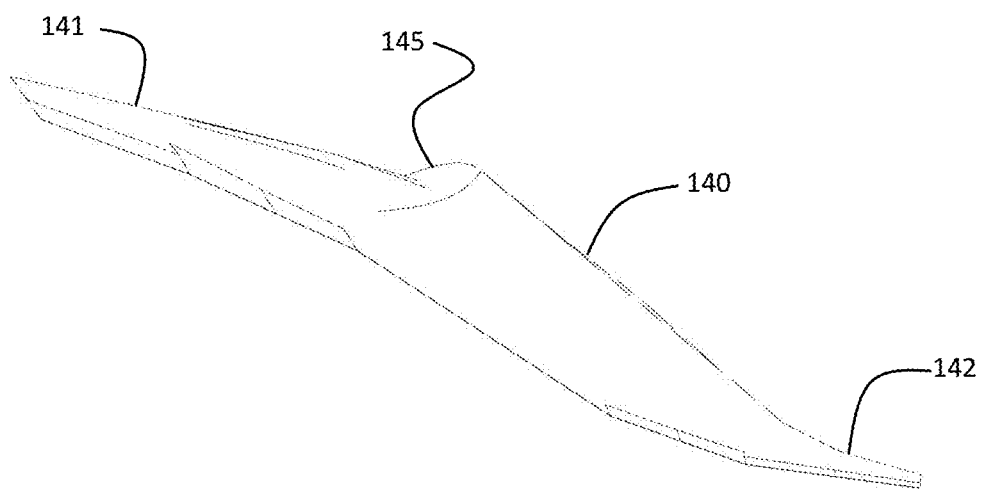
Figure 13A:
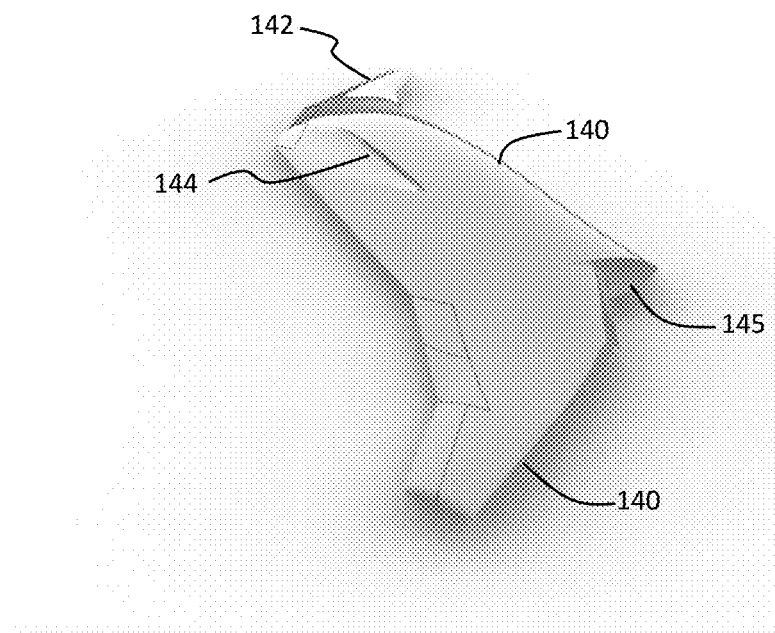
FIGS. 13A-B are shaded and line representations, respectively, of right side perspective views of a supersonic aircraft according to some embodiments of the present invention.
Figure 13B:
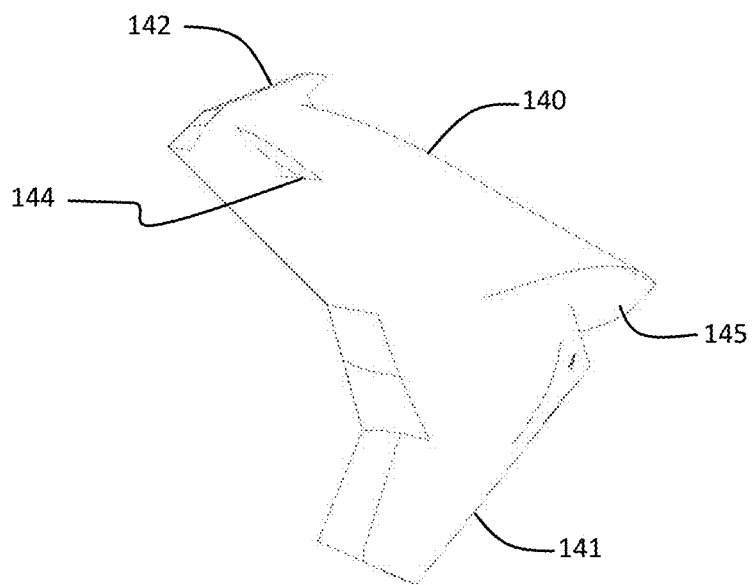
Figure 14A:
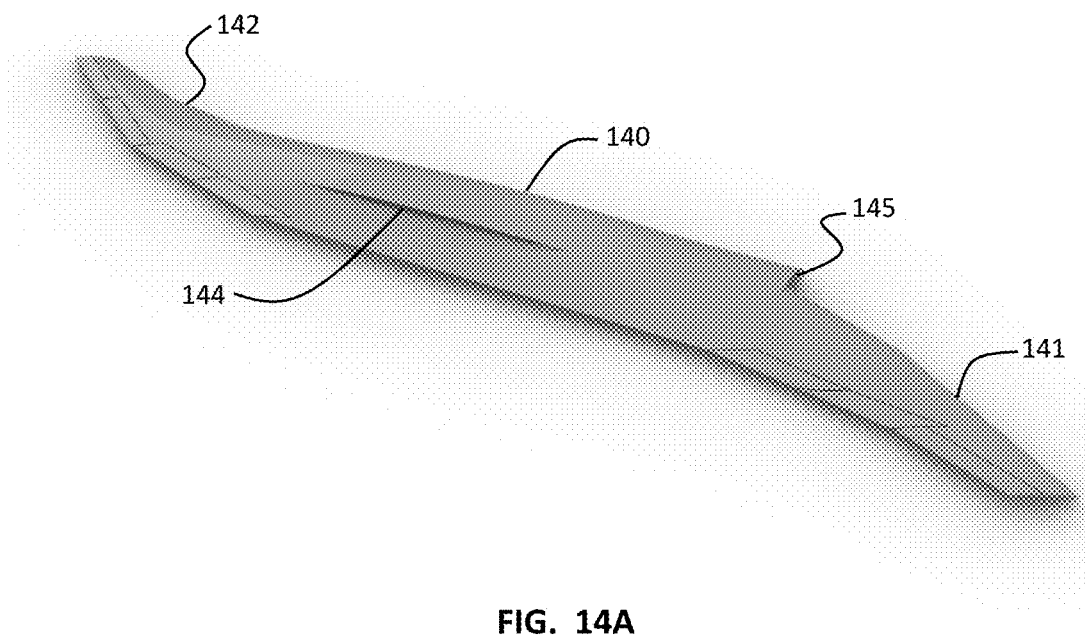
FIGS. 14A-B are shaded and line representations, respectively, of rear perspective views of a supersonic aircraft according to some embodiments of the present invention.
Figure 14B:
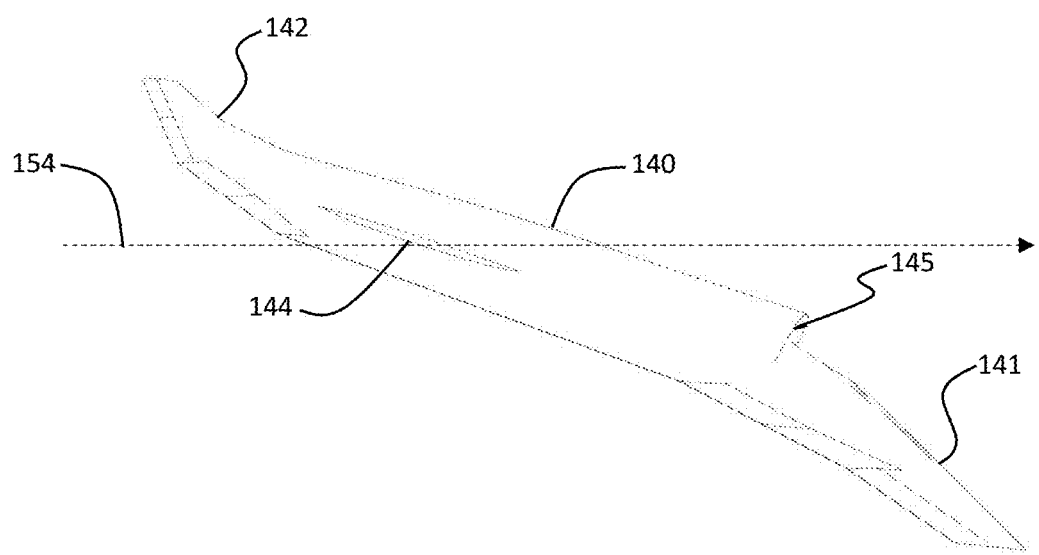
Figure 15A:
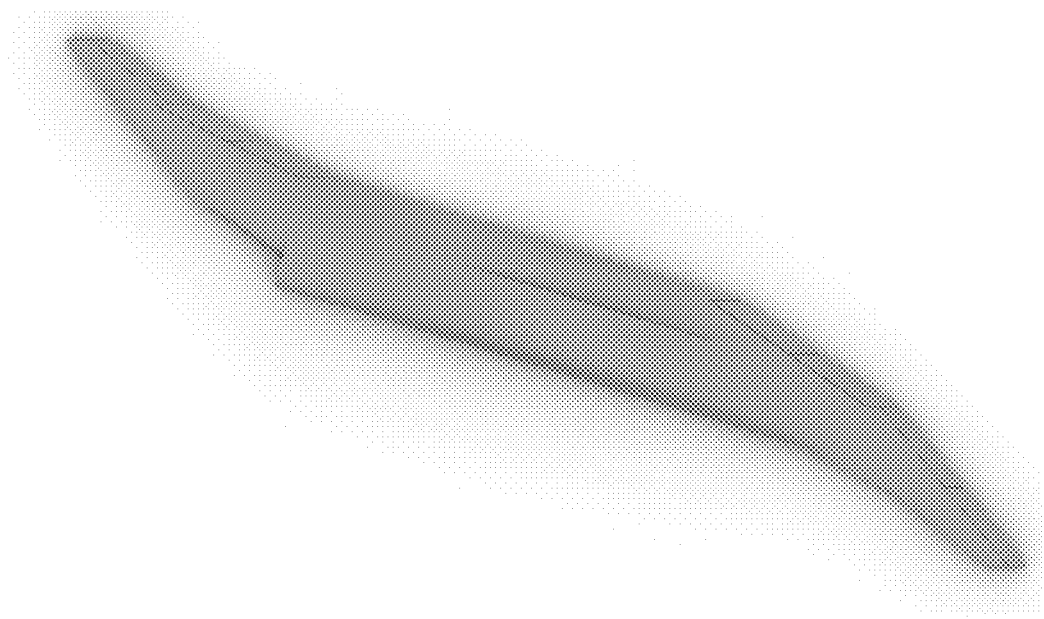
FIGS. 15A-B are shaded and line representations, respectively, of raised front side perspective views of a supersonic aircraft according to some embodiments of the present invention.
Figure 15B:
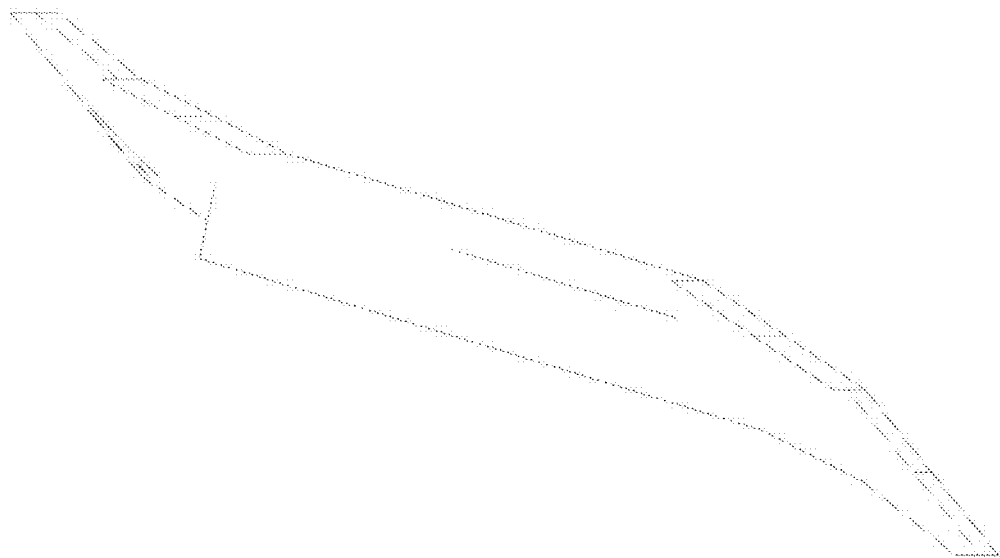
Figure 16A:
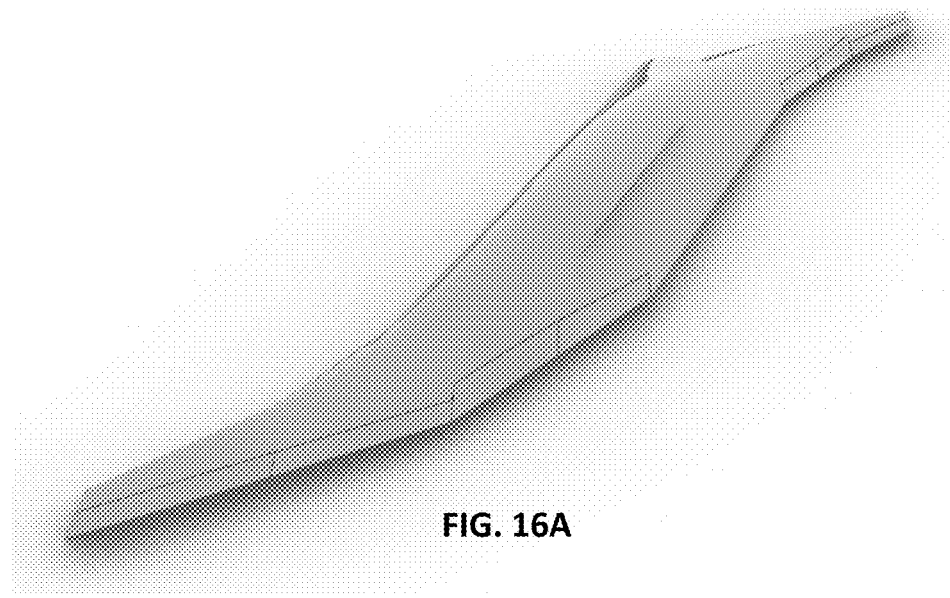
FIGS. 16A-B are shaded and line representations, respectively, of left rear perspective views of a supersonic aircraft according to some embodiments of the present invention.
Figure 16B:
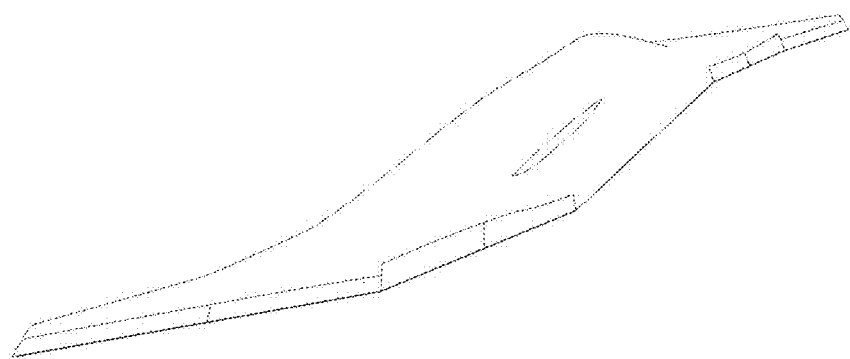

In some aspects, the use of the center segment as a repository for the pilots, the passengers, and other items which have volume, allows the center section to function somewhat as a fuselage of the aircraft, but without the disadvantages of a standard fuselage, while retaining advantages of an oblique wing. The thick center segment relative to the thickness of the wing segments may also be seen in that the relative thickness, defined as the ratio of the chord length to the segment thickness, is larger for the center segment relative to the wing segments. Although the wing segments may be thicker where they couple to the center segment, the wings will get much thinner in a transition region, similarly as they alter sweep through a transition region. FIG. 11 illustrates aspects of the oblique wing according to some embodiments of the present invention. As noted above, the multi-segment wing may be viewed as having a transition from the left wing segment 212 to the center segment 210 at a reference line 220, and as having a transition from the right wing segment 211 to the center segment 210 at a reference line 221. Within the reference lines 220, 221, the leading edge 210a and the trailing edge 210b of the center segment 210 are substantially parallel. The center segment 210 has an extended portion between its first end at reference line 220 and its second end at reference line 221, and in this portion the leading and trailing edges of the center segment are substantially parallel. The ratio of the chord length of the center segment to its span may be 1:4 in some aspects. In some aspects, the ratio of the chord length of the center segment to its span may be in the range of 1:3 to 1:5. In some aspects, the ratio of the chord length of the center segment to its span may be in the range of 1:2.5 to 1:4.5. In some aspects, the chord length of the center segment does not vary by more than 10% along the span of the center segment. In some aspects, the chord length of the center segment does not vary by more than 15% along the span of the center segment. In some aspects, the chord length of the center segment does not vary by more than 5% along the span of the center segment. Minimizing variation of chord length in the center section allows more or less uniform cross section of the cargo or passenger cabin, similar to the uniform cross section of a traditional passenger aircraft fuselage. The relatively constant airfoil cross section of the center section also simplifies the design of the propulsor units by reducing spanwise variation in inflow conditions. The relatively long and skinny configuration of the aircraft, where wing segments and the central section provide a joint body with a sizeable aspect ratio of length to chord, reduces wave volumetric drag of the aircraft in the supersonic regime. Combined with the increased thickness-to-chord ratio of the center segment, this range of chord and span ratios affords a good balance between aerodynamic performance and payload capacity.

Outboard of the center wing segment 210 there may be transition regions where the leading edge line of the center wing segment 210 transitions to the leading edge of the outer wing segments 211, 212. At the first end of the center wing segment 210 at reference line 220 the wing may transition until a reference line 241 wherein the leading edge of the left wing segment 212 becomes substantially linear. Within the transition area the left wing segment may curve around its leading edge to its outboard linear position. The left wing segment 212 may also taper down its chord length both within its transition area and continue to taper outboard of its transition area and out to the wingtip. At the second end of the center segment 210 at reference line 221 the wing may transition until a reference line 240 wherein the trailing edge of the right wing segment 211 becomes substantially linear. Within the transition area the right wing segment may curve around its trailing edge to its outboard linear position. The right wing segment 211 may also taper down its chord length both within its transition area and continue to taper outboard of its transition area and out to the wingtip. Both the left wing segment 212 and the right wing segment 211 are substantially thinner than the center segment 210. Although there may be variations along their lengths, the leading edge 210a and the trailing edge 210b of the center segment 210 are substantially parallel. The leadings edge 210a and the trailing edge 210b of the center segment 210 is also swept considerably more than the leading edges 211a, 212a of the wing segments 211, 212 outboard of the transition areas.

In some embodiments of the present invention various leading and trailing edges may be aligned in order to present lower observability profile for the aerial vehicle. Using FIG. 10 as an illustrative example, the leading edge 212a of the outer wing segment may be parallel to the trailing edge 211b of the opposite outer wing segment. Similarly, the trailing edge 212b of the outer wing segment may be parallel to the leading edge 211a of the opposite outer wing segment. In some aspects, the leading edges of the outer wing segments are parallel to the trailing edges of the opposite outer wing segments to within 2 degrees. In some aspects, the leading edges of the outer wing segments are parallel to the trailing edges of the opposite outer wing segments to within 5 degrees. In some aspects, the leading edges of the outer wing segments are parallel to the trailing edges of the opposite outer wing segments to within 8 degrees. Similarly, the leading edge of the center segment may be parallel to the trailing edge of the center segment to within 2 degrees. In some aspects, the leading edge of the center segment may be parallel to the trailing edge of the center segment to within 5 degrees. In some aspects, the leading edge of the center segment may be parallel to the trailing edge of the center segment to within 8 degrees. Although introduced herein with regard to the embodiment as seen in FIG. 10, it is understood that the leading edge/trailing edge parallelisms could be present in any of the disclosed embodiments.

In some embodiments of the present invention, as seen in FIGS. 12A through 17, a multi-segment oblique wing aircraft 130 includes a center wing segment 140, a left wing segment 141, and a right wing segment 142. The center wing segment 140 is substantially thicker in the Zb direction, and is thick enough to allow for propulsion units in this thicker area of the wing. The aircraft may be adapted to fly at supersonic speeds. In this illustrative example, the aircraft 130 may be adapted to fly at supersonic speeds in the range of Mach 1.2. Although illustrated with the right wing segment 142 as the leading portion of the oblique wing, it is to be understood that left and right may be mirrored in different embodiments and be within the disclosure of the present invention.

An air inlet 145 is located at or near the conjunction of the center wing segment 140 and the right wing segment 142, which is the forward wing segment during flight in this embodiment. In some aspects, the air inlet 145 is in a formed space wherein the leading edge of the center segment 140, inboard of the inlet 145, ends, and the next outboard portion of the leading edge is rearward of the inboard portion. The inlet 145 envelopes the next outboard portion of the leading edge, which creates an air inlet in a void behind the leading edge of the more inboard portion. In this manner, the next outboard portion of the leading edge cooperates with the inlet 145, providing airflow slowing and pre-compression. An air outlet 144 is seen on the upper surface of the center segment 140. A direction reference line 154 illustrates the flight path of the aircraft during forward flight, and is placed approximately at the center of mass of the aircraft. As can be seen, the air inlet 145 is substantially outboard (starboard in this configuration) of the center line of the aircraft. In this illustrative embodiment, the air outlet 133 is centered on the nominal centerline of the aircraft in its forward flight configuration. In some aspects, the leading edge outboard of the air inlet 145, by being forward of the inlet, will deflect air into the air inlet as well.

In some aspects, the relative the ratio of the thickness of the center segment to the outer segments is in the range of 1.5 to 10.

Figure 17:
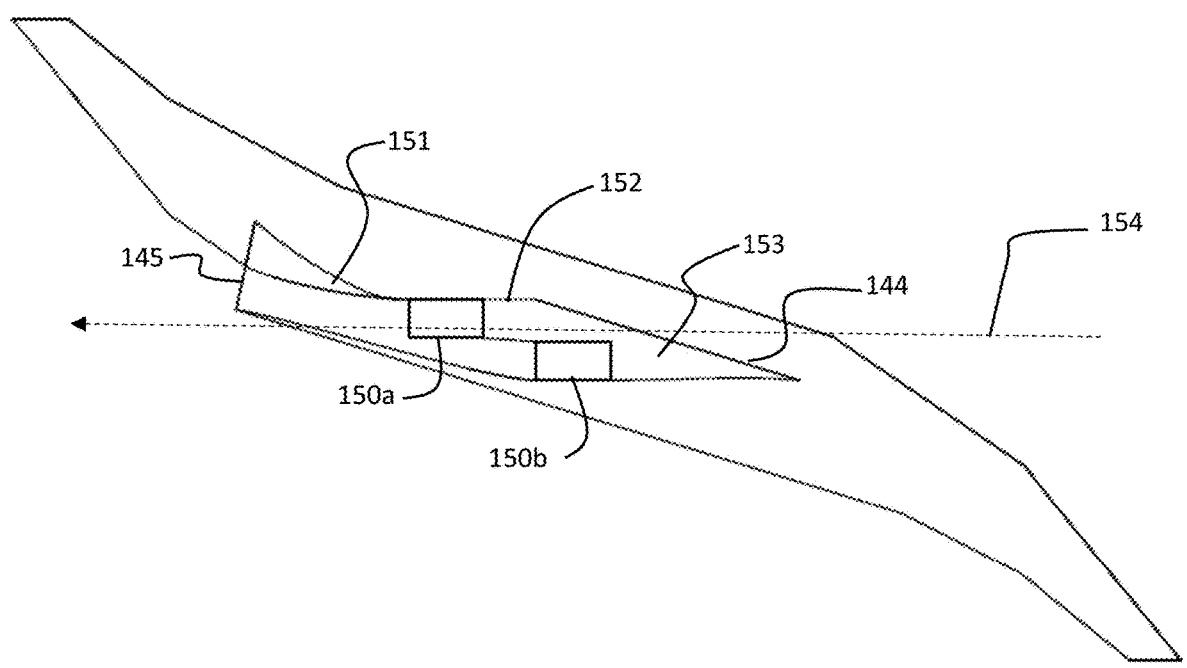
FIG. 17 is an illustrative top view of the internal flow path and propulsion units of a supersonic aircraft according to some embodiments of the present invention.

FIG. 17 illustrates the internal ducting and the internal location of the propulsion units 150a, 150b within the center segment 140. The air inlet 145 is fluidically coupled to an inlet duct 151 which routes air to the propulsion units 150a, 150b. Although illustrated here with two propulsion units, in some aspects there may be one propulsion unit, or a plurality of propulsion units. The propulsion units 150a, 150b are then fluidically coupled to the outlet duct 152 which routes air to the air outlet 144. In some aspects, there may be vanes 153 rearward of the propulsion units at or near the air outlet which allows for lateral thrust vectoring. As can be seen, the principal axis of the propulsion unit, which may be the rotation axis of thrust generating components, is in line with the ultimate thrust direction. In some aspects, the primary axis of the propulsion unit or units may be aligned with the span direction of the center segment 140 of the oblique wing aircraft 130. The propulsion units, which may be by design constrained to be of a larger diameter, or may be by design choice designed to be of a larger diameter, may reside within the thicker area of the center segment 140 without presenting any exterior perturbation of the outside surface of the wing. In some aspects, in this manner, the exterior surfaces of the center segment will be uniform across the center segment and will not have shape changes or deformations that are accommodation for the internal mounting of the propulsion unit or units within the center segment. In some aspects, the thrust may be differentiated between the propulsion units 150a, 150b, to change the heading of the aircraft, and this may more practical with electric propulsion units.

Figure 18:
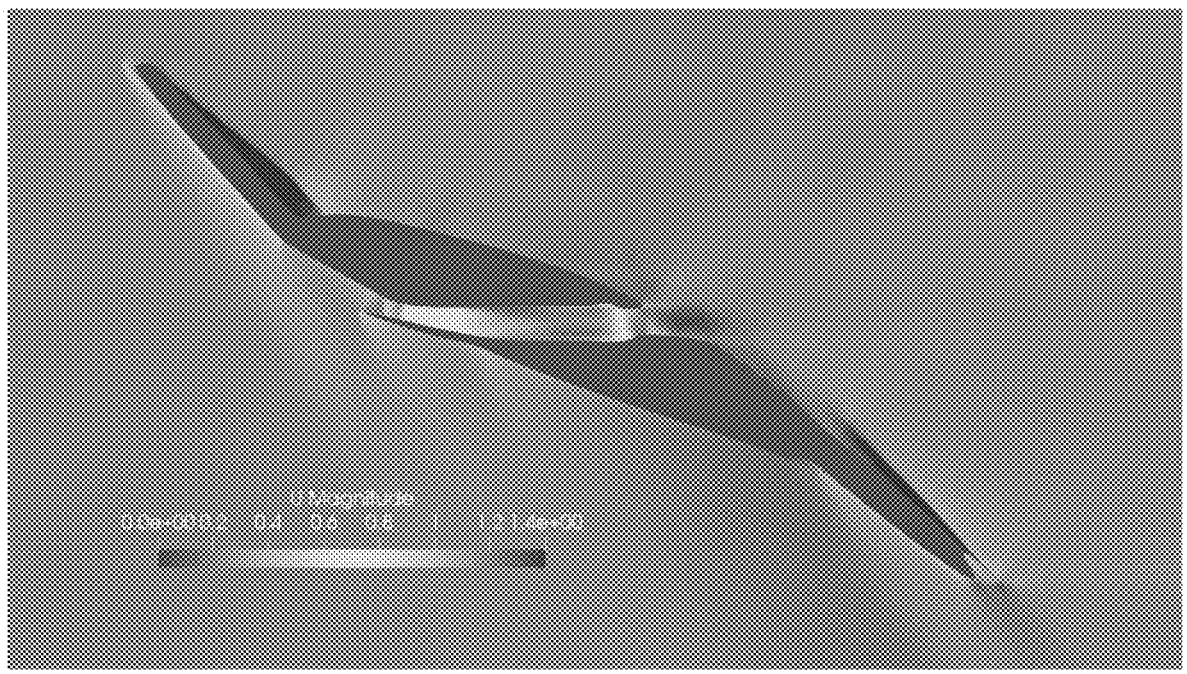
FIG. 18 is a flow velocity determination for flow into and within a supersonic aircraft according to some embodiments of the present invention.

FIG. 18 illustrates a velocity solution for the flow through the interior of the aircraft in a supersonic flight configuration.

The use of a long, thick, center segment allows for the placement of pilots and passengers in the center segment, and may allow for the use of the multi-segment oblique wing aircraft as a high speed commercial aircraft. In a certain sense, the center segment takes on the ferrying function of a traditional fuselage without the drawbacks of a traditional fuselage. Further, the separation of the wings by the long center segment during a highly swept high speed flight provides excellent control authority due to the possibility to place multiple trailing edge control surfaces such that they can affect both the pitch and roll axes when their actions are properly combined. In some aspects, the ratio of the span of the center segment relative to the span of each wing is in the range of 1:1 to 3:1. The optimum ratio of thickness along the span will depend on the details of the aircraft requirements and materials, but should be designed to balance aerodynamic drag (particularly wave drag), structural weight, and payload or fuel requirements; optimum thickness ratios are likely to fall in the stated range. In some aspects, the average thickness of the center segment relative to the average thickness of the wings is in the range of 1.5:1 to 20:1. In some aspects, the ratio of the relative thickness of the center segment to the relative thickness of the wings is in the range of 1.5 to 10.

In some aspects, embodiments of the present invention may benefit from adding more pitch authority than the flying wing alone, depending on the details of the control surface layout and wing planform design. In some aspects, the multi-segment oblique flying wing aircraft is adapted to take-off, land, and cruise in the same swept configuration/orientation.

In some aspects, the sweep of the wing segments remains constant during different flight modes. The forward sweep of the leading outer wing segment may be 25 degrees. In some aspects, the forward sweep of the leading outer wing segment may be in the range of 15 to 35 degrees. In some aspects, the forward sweep of the leading outer wing segment may be in the range of 0 to 60 degrees. The rearward sweep of the trailing outer wing segment may be 35 degrees. In some aspects, the rearward sweep of the trailing outer wing segment may be in the range of 25 to 45 degrees. In some aspects, the rearward sweep of the trailing outer wing segment may be in the range of 0 to 60 degrees. The sweep of the center wing segment may be 50 degrees. In some aspects, the sweep of the center wing segment may be in the range of 35 to 65 degrees. In some aspects, the sweep of the center wing segment may be in the range of 25 to 75 degrees. The auxiliary control surfaces may include controllable control surfaces along its trailing edge.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An aerial vehicle, said aerial vehicle comprising an oblique flying wing, said oblique flying wing comprising:
a center wing segment, said center wing segment comprising a leading edge and a trailing edge, said leading edge and said trailing edge parallel within 10 degrees along their length;
a forward wing segment, said forward wing segment coupled to a first end of said center segment, said forward wing segment comprising a leading edge and a trailing edge, wherein the spanwise average of the quarter chord of said forward wing segment is swept more than 10 degrees differently than the spanwise average of the quarter chord of the center wing segment;
a rear wing segment, said rear wing segment coupled to a second end of said center segment, said rear wing segment comprising a leading edge and a trailing edge, wherein the spanwise average of the quarter chord of said rear wing segment is swept more than 10 degrees differently than said spanwise average of the quarter chord of the center wing segment;
an inlet duct in the area of the confluence of said forward wing segment and said center wing segment;
a propulsion unit, said propulsion unit residing within said center wing segment, said propulsion unit comprising a principal axis; wherein said inlet duct is fluidically coupled to said propulsion unit; and
an outlet duct, said outlet duct residing on a rear upper surface of said center wing segment, said outlet duct fluidically coupled to said propulsion unit.

2. The aerial vehicle of claim 1 wherein said center wing segment is substantially thicker than said forward wing segment and said rear wing segment.

3. The aerial vehicle of claim 1 wherein said principal axis of said propulsion unit is parallel to the spanwise average of the quarter chord of said center wing segment within 10 degrees.

4. The aerial vehicle of claim 2 wherein said principal axis of said propulsion unit is parallel to the spanwise average of the quarter chord of said center wing segment within 10 degrees.

5. The aerial vehicle of claim 2 wherein said forward wing segment is forward swept in the range of 15 to 35 degrees, and wherein said middle wing segment is swept in the range of 35 to 65 degrees, and wherein said rear wing segment is rearward swept in the range of 25 to 45 degrees, while in a cruise configuration.

6. The aerial vehicle of claim 2 wherein said forward wing segment is forward swept in the range of 0 to 60 degrees, and wherein said middle wing segment is swept in the range of 25 to 75 degrees, and wherein said rear wing segment is rearward swept in the range of 0 to 60 degrees, while in a cruise configuration.

7. The aerial vehicle of claim 4 wherein said principal axis of said propulsion unit is parallel to the spanwise average of the quarter chord of said center wing segment within 10 degrees.

8. The aerial vehicle of claim 4 wherein said principal axis of said propulsion unit is parallel to the spanwise average of the quarter chord of said center wing segment within 20 degrees.

9. The aerial vehicle of claim 5 wherein said principal axis of said propulsion unit is parallel to the spanwise average of the quarter chord of said center wing segment within 10 degrees.

10. The aerial vehicle of claim 5 wherein said principal axis of said propulsion unit is parallel to the spanwise average of the quarter chord of said center wing segment within 20 degrees.

11. The aerial vehicle of claim 2 wherein the ratio of the relative thickness of the center wing segment to the relative thickness of the outer wing segments is in the range of 1.5 to 10.

12. The aerial vehicle of claim 2 wherein the ratio of the relative thickness of the center wing segment to the relative thickness of the outer wing segments is in the range of 5 to 10.

13. The aerial vehicle of claim 11 wherein said principal axis of said propulsion unit is parallel to the spanwise average of the quarter chord of said center wing segment within 20 degrees.

14. An aerial vehicle adapted for supersonic flight, said aerial vehicle comprising an oblique flying wing, said oblique flying wing comprising:
- a center wing segment, said center wing segment comprising a leading edge and a trailing edge, said leading edge and said trailing edge parallel within 10 degrees along their length;
- a forward wing segment, said forward wing segment coupled to a first end of said center segment, said forward wing segment comprising a leading edge and a trailing edge, wherein the spanwise average of the quarter chord of said forward wing segment is swept more than 10 degrees differently than the spanwise average of the quarter chord of the center wing segment;
- a rear wing segment, said rear wing segment coupled to a second end of said center segment, said rear wing segment comprising a leading edge and a trailing edge, wherein the spanwise average of the quarter chord of said rear wing segment is swept more than 10 degrees differently than said spanwise average of the quarter chord of the center wing segment;
- an air inlet in the area of the confluence of said forward wing segment and said center wing segment, said inlet duct formed in part by the cessation of the leading edge of said center wing segment and then a further continuance of a leading edge rearward of the ceased leading edge, thereby forming a void behind the ceased leading edge;
- an inlet duct fluidically coupled to said air inlet;
- a propulsion unit, said propulsion unit residing within said center wing segment, said propulsion unit comprising a principal axis; wherein said inlet duct is fluidically coupled to said propulsion unit; and
- an outlet duct, said outlet duct residing on a rear upper surface of said center wing segment, said outlet duct fluidically coupled to said propulsion unit.

15. The aerial vehicle of claim 13 wherein said center wing segment is substantially thicker than said forward wing segment and said rear wing segment.

16. The aerial vehicle of claim 13 wherein said principal axis of said propulsion unit is parallel to the spanwise average of the quarter chord of said center wing segment within 10 degrees.

17. The aerial vehicle of claim 14 wherein said principal axis of said propulsion unit is parallel to the spanwise average of the quarter chord of said center wing segment within 10 degrees.

18. The aerial vehicle of claim 13 wherein the ratio of the relative thickness of the center wing segment to the relative thickness of the outer wing segments is in the range of 1.5 to 10.

19. The aerial vehicle of claim 6 wherein the ratio of the relative thickness of the center wing segment to the relative thickness of the outer wing segments is in the range of 1.5 to 10.

* * * * *